United States Patent
Watanabe et al.

(10) Patent No.: US 9,038,659 B2
(45) Date of Patent: May 26, 2015

(54) RELIEF VALVE DEVICE

(75) Inventors: Manabu Watanabe, Gunma-ken (JP); Junichi Miyajima, Gunma-ken (JP)

(73) Assignee: YAMADA MANUFACTURING CO., LTD., Kiryu-Shi, Gunma-Ken (JP)

( * ) Notice: Subject to any disclaimer, the term of this patent is extended or adjusted under 35 U.S.C. 154(b) by 489 days.

(21) Appl. No.: 13/426,551

(22) Filed: Mar. 21, 2012

(65) Prior Publication Data

US 2012/0241022 A1 Sep. 27, 2012

(30) Foreign Application Priority Data

Mar. 27, 2011 (JP) .................................. 2011-69045

(51) Int. Cl.
*F01M 1/16* (2006.01)
*F16K 31/40* (2006.01)
*F16K 31/122* (2006.01)

(52) U.S. Cl.
CPC ................ *F01M 1/16* (2013.01); *F16K 31/406* (2013.01); *F16K 31/1221* (2013.01)

(58) Field of Classification Search
CPC ............ F01M 1/16; F01M 3/02; F04C 14/24; F16K 31/406; F16K 31/122; F16K 31/1221
USPC ..................... 137/596, 596.16, 565.14, 625.6, 137/625.64, 625.33, 625.38, 625.39, 137/565.34, 601.13, 601.14, 596.14, 487.5; 123/196 R; 184/6.12, 37; 251/30.01, 251/325
See application file for complete search history.

(56) References Cited

U.S. PATENT DOCUMENTS

| | | | |
|---|---|---|---|
| 5,085,181 A * | 2/1992 | Feuling ...................... | 123/90.12 |
| 5,217,085 A * | 6/1993 | Barrie et al. ................ | 184/104.1 |
| 5,417,402 A * | 5/1995 | Speybroeck ............... | 251/30.01 |
| 6,938,873 B2 * | 9/2005 | Fischer ....................... | 251/30.04 |
| 2009/0311115 A1 * | 12/2009 | Ono et al. ..................... | 417/279 |
| 2011/0067667 A1 * | 3/2011 | Miyachi et al. ............ | 123/196 R |
| 2012/0118257 A1 * | 5/2012 | Chung ....................... | 123/196 R |

FOREIGN PATENT DOCUMENTS

JP 05-026024 A 2/1993

* cited by examiner

*Primary Examiner* — William McCalister
*Assistant Examiner* — Michael R Reid
(74) *Attorney, Agent, or Firm* — McGinn IP Law Group, PLLC

(57) ABSTRACT

The invention allows securing greater discharge pressure and flow rate at high revolutions of an engine in order to secure lubrication and cooling, while reducing discharge pressure and flow rate at low and medium revolutions of the engine in order to improve efficiency. The invention includes a housing; a relief valve; a valve passage; a main discharge flow channel; a main relief flow channel; an auxiliary relief flow channel; a solenoid valve mounted on the auxiliary relief flow channel; and a spring. The solenoid valve is controlled so as to switch between communication and shut-off between the auxiliary relief flow channel and the large-diameter passage section in accordance with an increase or decrease in engine revolutions, and oil in the large-diameter passage section is discharged when the shut-off is implemented.

16 Claims, 8 Drawing Sheets

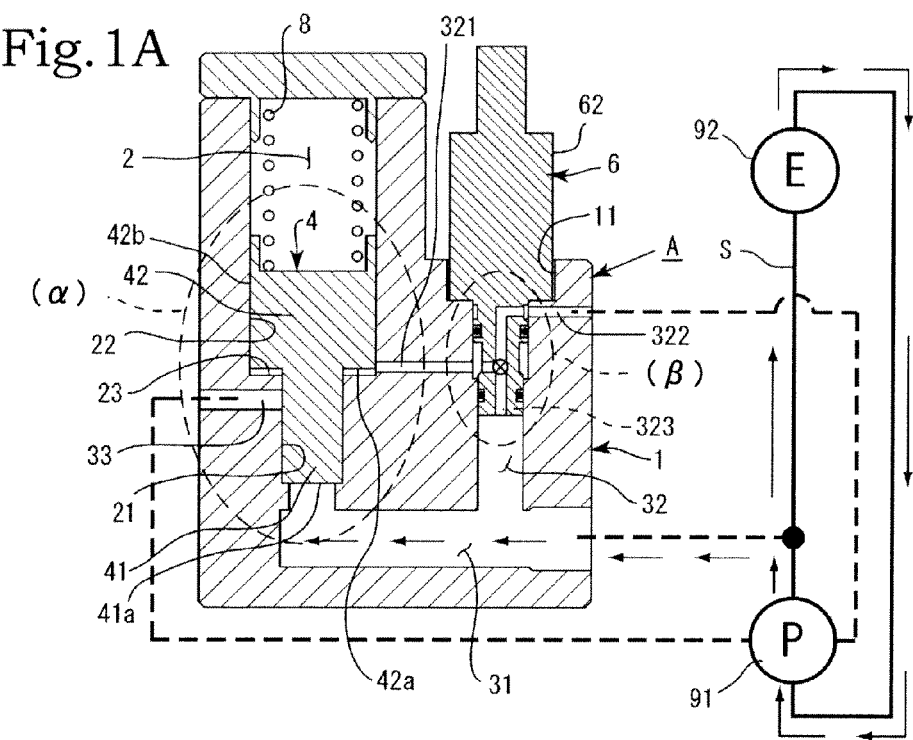
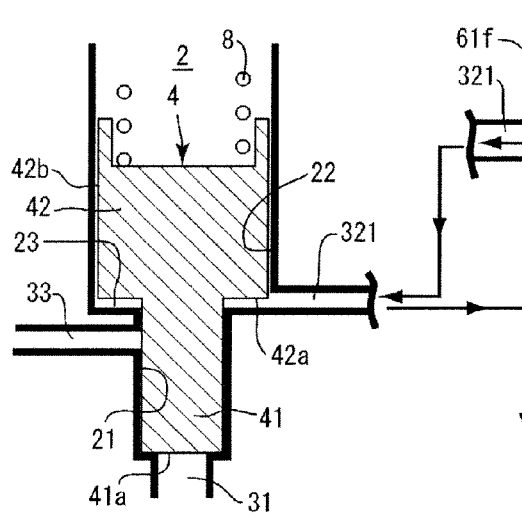
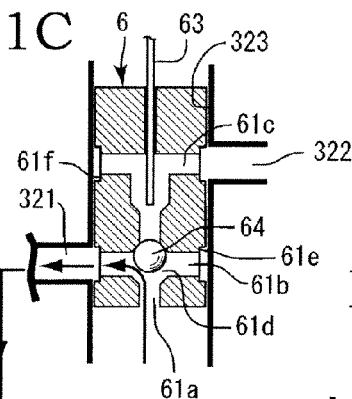
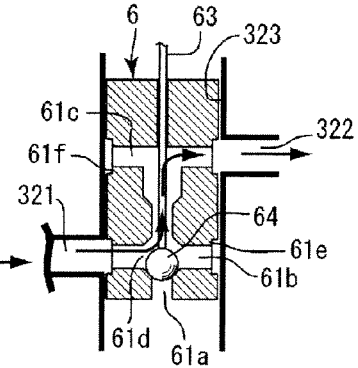
Fig.1A
Fig.1B
Fig.1C
Fig.1D

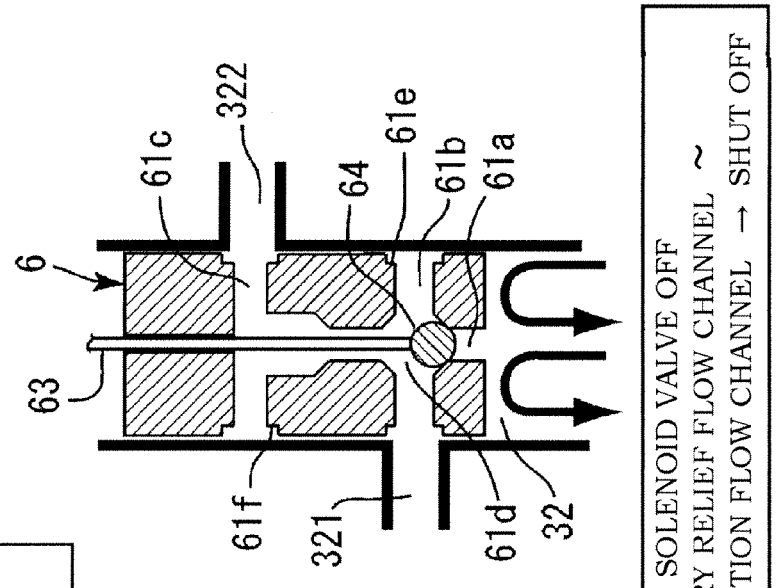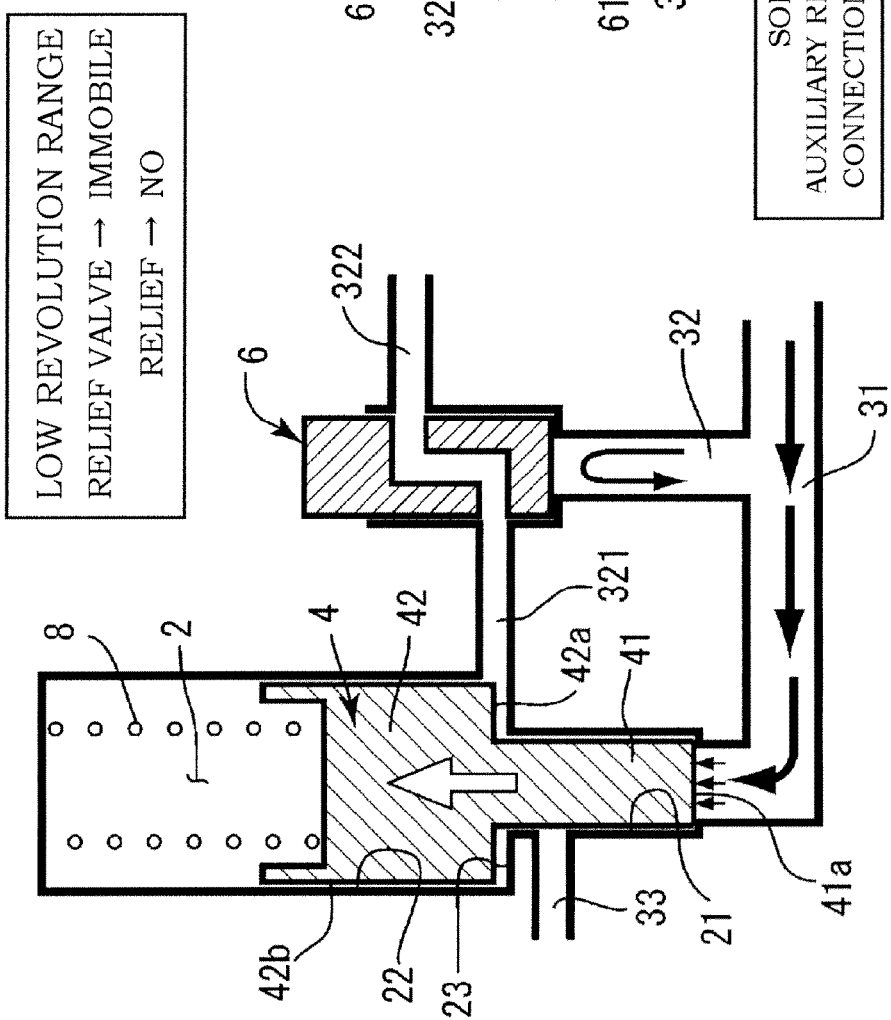

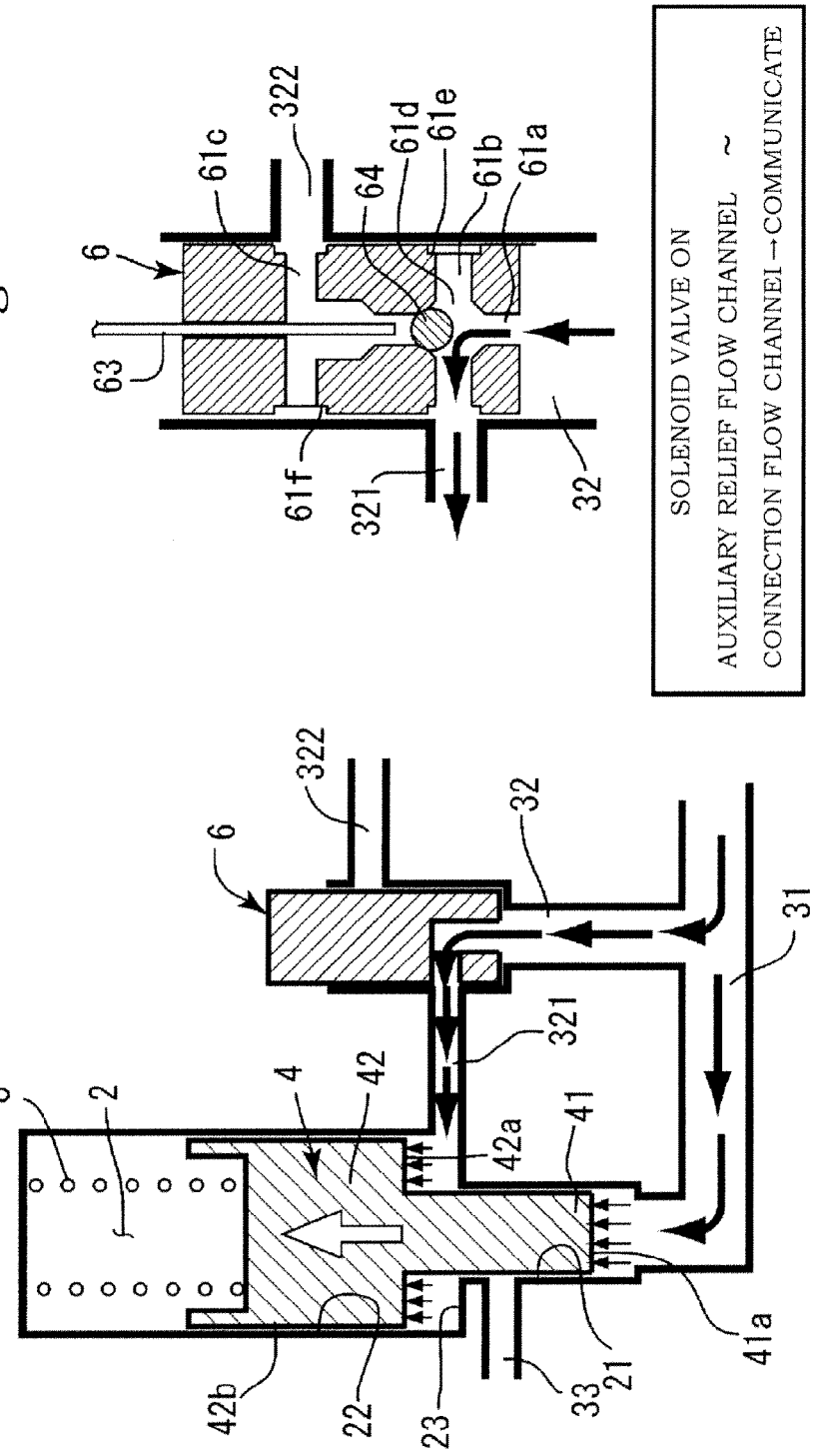

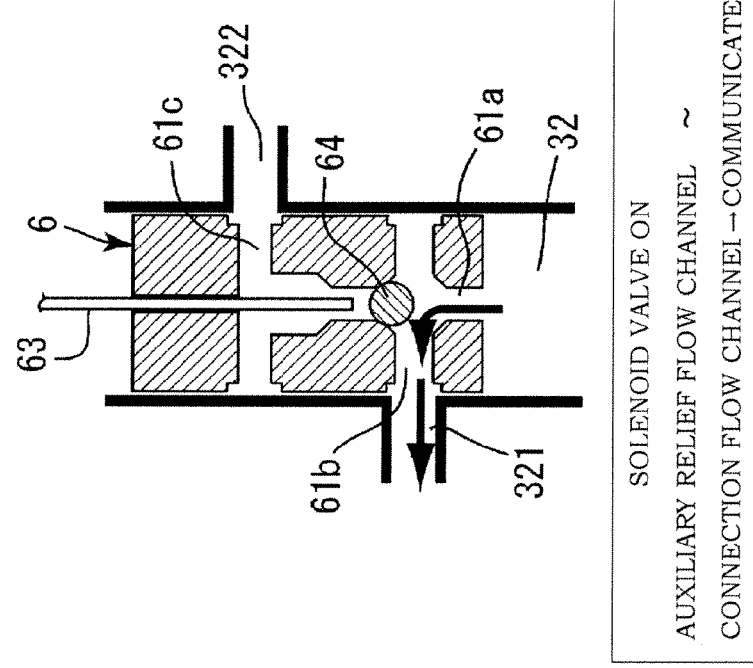
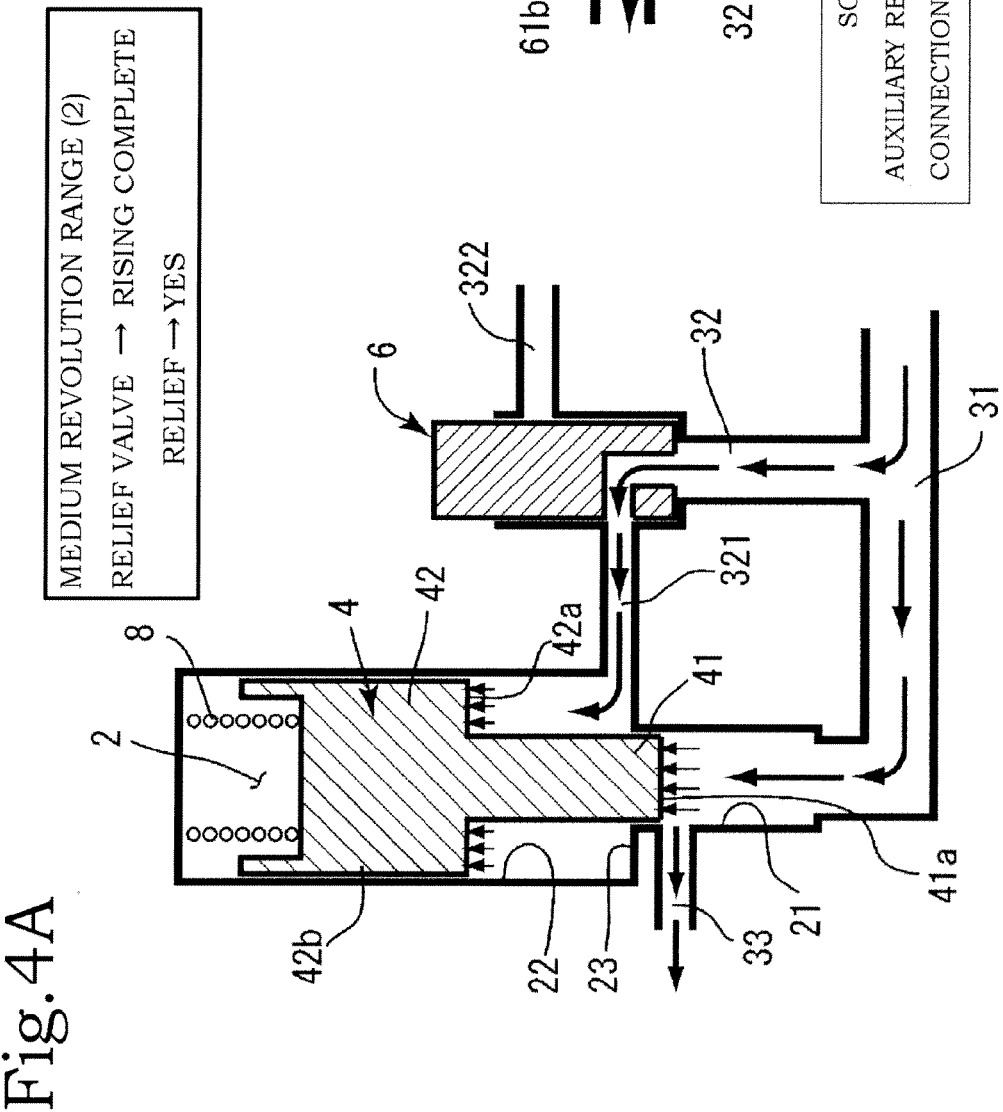
Fig.4A
Fig.4B

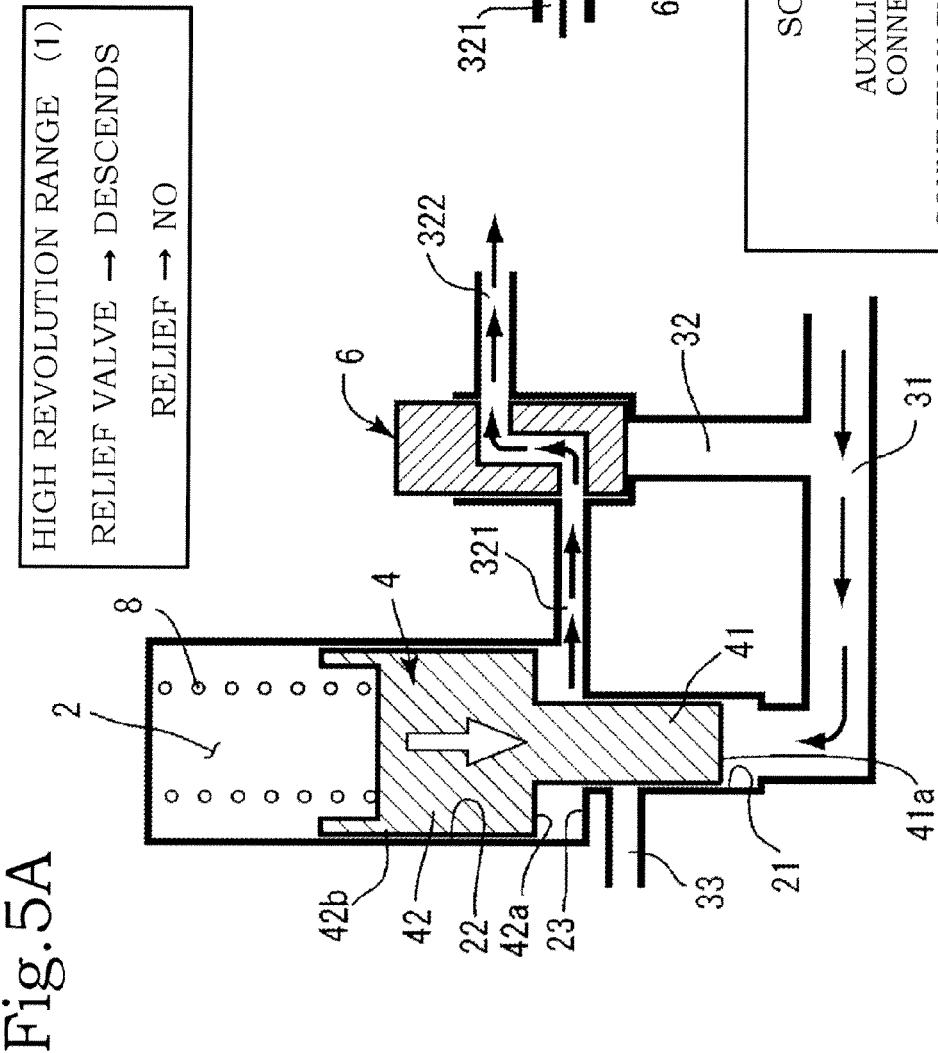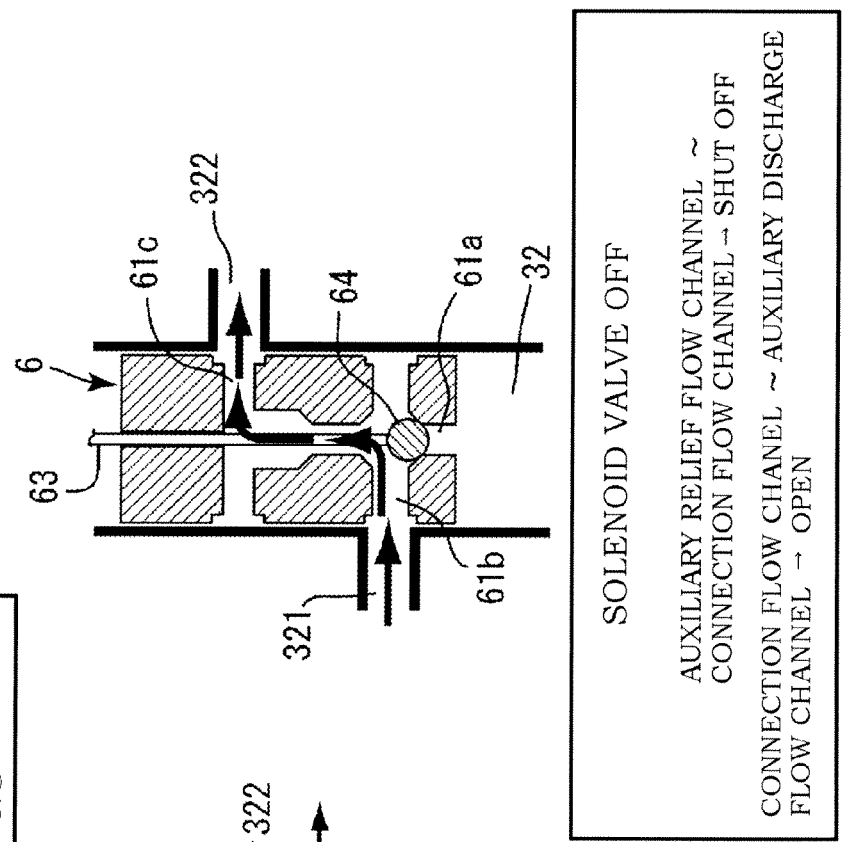

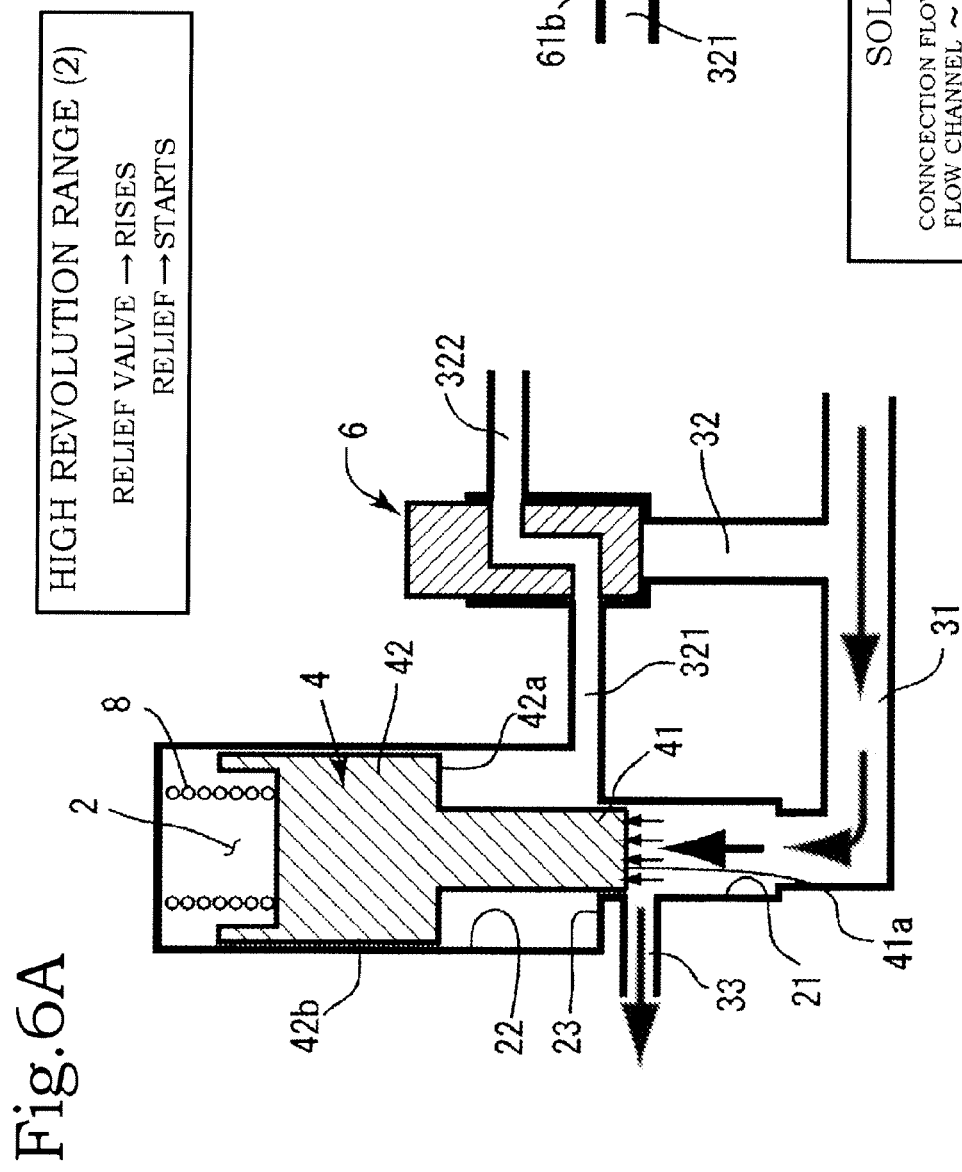

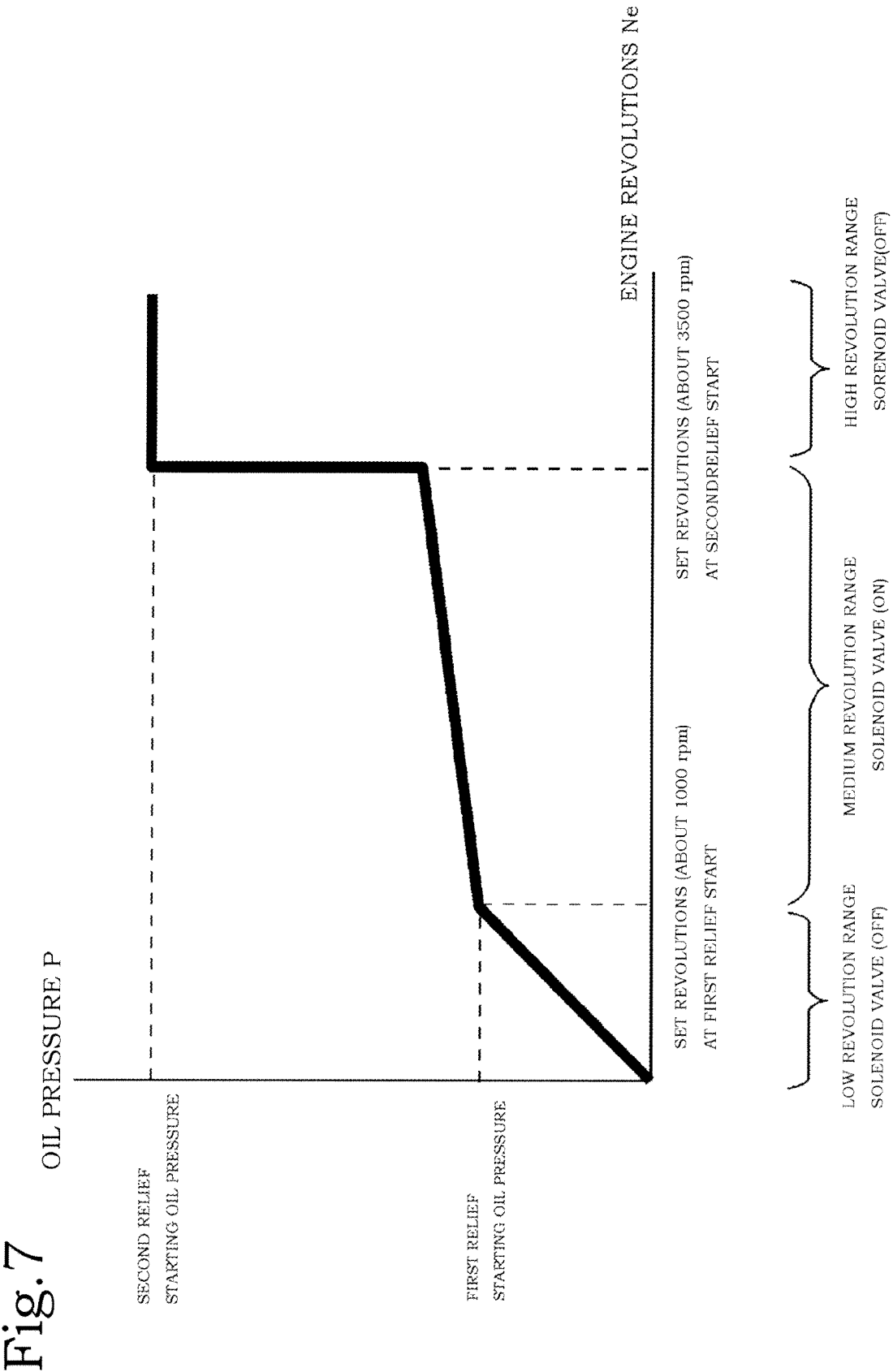

Fig.8A
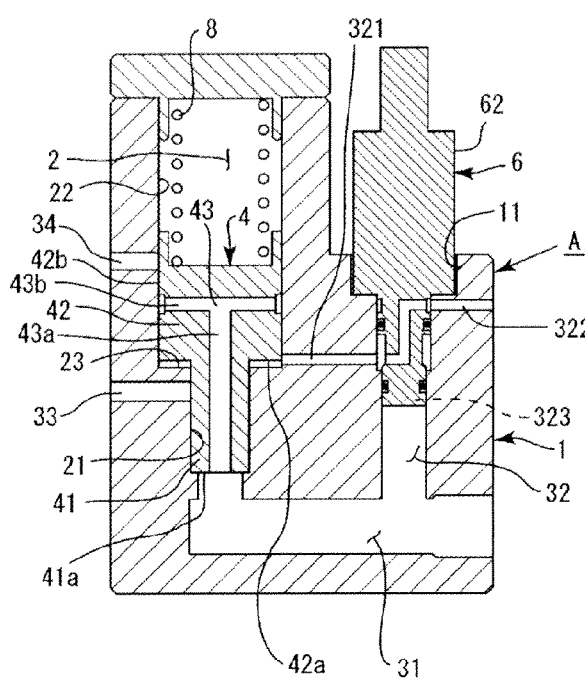
Fig.8B
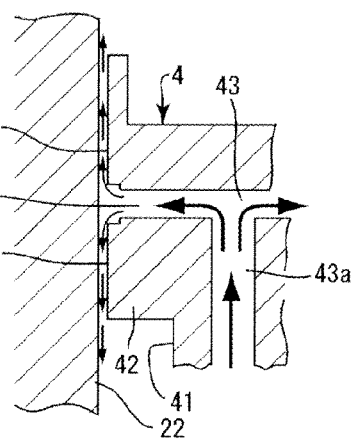
Fig.8C
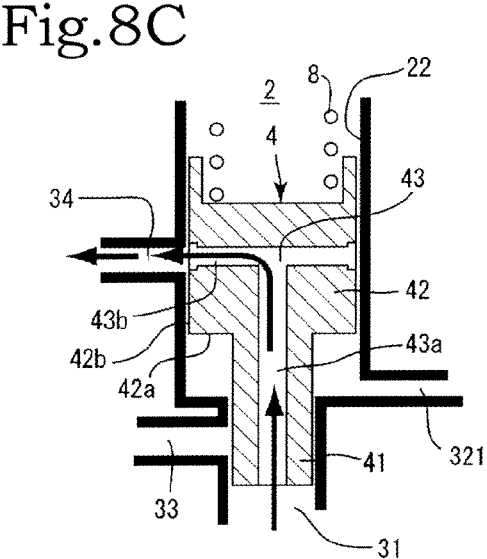
Fig.8D

RELIEF VALVE DEVICE

BACKGROUND OF THE INVENTION

1. Field of the Invention

The present invention relates to a relief valve device, in an oil pump of, for instance, an engine for vehicles, that allows securing greater discharge pressure and flow rate at high revolutions of an engine in order to secure lubrication and cooling, while reducing discharge pressure and flow rate at low and medium revolutions of the engine in order to improve efficiency.

2. Description of the Related Art

Conventional relief valves that modify relief pressure depending on the magnitude of engine revolutions (high-low revolutions) have been disclosed (Japanese Patent Application Publication No. H5-26024) wherein a first relief pressure and a second relief pressure are set in accordance with the magnitude of engine revolutions (high-low revolutions). Japanese Patent Application Publication No. H5-26024 (FIG. 2) discloses a relief valve that has a solenoid valve 19, as well as a mechanical relief valve that comprises a valve body 15 and a piston 16 that resist, on account of oil pressure, the urging force of a coil spring 17.

The coil spring 17 is interposed, in a compressed state, between the valve body 15 and the piston 16, and the solenoid valve 19 controlled to be on/off according engine revolutions; as a result, the oil pressure to the piston 16, via a communication passage 18, is turned on/off, the piston 16 moves to the left or right, and there changes the mounting length of the coil spring 17. The magnitude of relief pressure by the mechanical relief valve changes also as a result.

In Japanese Patent Application Publication No. H5-26024, the mounting length of a spring is modified in order to cause a mechanical relief valve to operate in two stages. In order to modify the spring length, means is employed to supply oil pressure from both the left and right of the spring, such that switching between action of oil pressure from the left or from the right is accomplished through switching between oil passages in the solenoid valve. Oil passages must thus be provided both on the left and right of the mechanical relief valve in order to supply oil pressure from both the left and the right. The total length of the installed mechanical relief valve becomes thus longer.

The configuration of the mechanical relief valve includes not only the valve body 15 and the coil spring 17, but also, in addition, the piston 16, which results in an increased number of components. Also, this component must be accordingly worked into the layout (design), and thus the total length of the installed mechanical relief valve becomes proportionally longer in accordance with the layout.

The valve body 15 and the piston 16 are two components that can move by virtue of oil pressure. The presence of such two movable components makes it necessary to secure the operation and the dimensions of both components. This translates into complex structures and mechanisms, as well as a need for high-precision machining and assembly, while the operation becomes more difficult to guarantee. All these factors contribute to driving costs up.

When engine revolutions are high, oil pressure acts on the piston 16 at the rear face of the mechanical relief valve, the piston 16 is displaced to the left, and the mounting length of the spring is shortened; as a result, relief takes place at the second relief pressure, which is higher than the first relief pressure. Upon switching to action of oil pressure on the piston 16, the piston 16 at the rear face of the mechanical relief valve is displaced to the left in a state where oil pressure is acting on the valve body 15 at the front face. Therefore, oil pressure acts simultaneously from both sides, i.e. the front face and the rear face, onto the coil spring 17.

SUMMARY OF THE INVENTION

The behavior of the valve body 15 and the piston 16 may become unstable as a result. It is an object (problem to be solved) of the present invention to provide a relief valve device in an oil pump of, for instance, an engine for vehicles, that allows reducing discharge pressure and flow rate at low and medium revolutions of an engine in order to improve efficiency, and that allows securing greater discharge pressure and flow rate at high revolutions of the engine in order to secure lubrication and cooling.

As a result of diligent research directed at solving the above problem, the inventors found that the problem is solved by a first invention being a relief valve device that comprises a housing; a relief valve formed of a small-diameter section having a main pressure-receiving surface and a large-diameter section having a stepped site as an auxiliary pressure-receiving surface; a valve passage formed of a small-diameter passage section and a large-diameter passage section; a main discharge flow channel that communicates the small-diameter passage section with the exterior of the housing; a main relief flow channel that communicates with the small-diameter passage section; an auxiliary relief flow channel that communicates with the large-diameter passage section; a solenoid valve mounted on the auxiliary relief flow channel; and a spring that elastically urges the relief valve in a direction opposite to a pressure relief direction, wherein the solenoid valve is controlled so as to switch between communication and shut-off between the auxiliary relief flow channel and the large-diameter passage section, in accordance with an increase or decrease in engine revolutions, and oil in the large-diameter passage section is discharged when the shut-off is implemented.

The above problem is solved by a second invention wherein, in the relief valve device of the first invention, the auxiliary relief flow channel branches from the main relief flow channel. The above problem is solved by a third invention wherein, in the relief valve device of the first or second invention, an axial direction dimension of the small-diameter section of the relief valve is formed to be longer than a total passage length of the small-diameter passage section.

The above problem is solved by a fourth invention wherein, in the relief valve device of any one of the first, second and third inventions, an in-valve flow channel, which communicates from the main pressure-receiving surface over an outer peripheral side face of the large-diameter section, is formed inside the relief valve. The above problem is solved by a fifth invention wherein, in the relief valve device of the fourth invention, a preliminary discharge flow channel is formed in the large-diameter passage section, and a flow channel opening of the in-valve flow channel, on the side of the large-diameter section, can communicate with the preliminary discharge flow channel.

In the first place, the first invention allows minimizing the number of components that guarantees device operation, and affords a simpler structure and simpler mechanism, as well as easier machining and easier assembly, all of which allows keeping costs down. Secondly, the first invention allows supplying oil at pressures that are most suited for a low revolution range, a medium revolution range, and a high revolution range, of engine revolutions. That is, the discharge pressure and flow rate of hydraulic oil are lowered in order to improve efficiency, from low revolutions to medium revolutions; in a high revolution range, meanwhile, high discharge pressure and high flow rate can be secured as required for lubrication and cooling, and engine reliability can be enhanced.

The second invention allows simplifying the flow channel structure, and affording a smaller size overall, by virtue of a configuration wherein the auxiliary relief flow channel branches from the main relief flow channel. In the third invention, an axial direction dimension of the small diameter section of the relief valve is formed to be longer than a total passage length of the small-diameter passage section. Therefore, a structure is achieved wherein the auxiliary pressure-receiving surface can readily receive the pressure of relief oil, through simple communication of the small-diameter passage section with the large-diameter passage section at the vicinity of the boundary with the small-diameter passage section.

In the fourth invention, an in-valve flow channel, which communicates from the main pressure-receiving surface over an outer peripheral side face of the large-diameter section, is formed inside the relief valve. As a result, some of the oil is supplied, from the main pressure-receiving surface, into the valve passage (large-diameter passage section), from the outer peripheral side face of the large-diameter section, via the in-valve flow channel. This oil fills the gap between the relief valve and the valve passage; as a result, An effect is elicited wherein the oil functions as lubricating oil upon displacement of the relief valve in the valve passage.

In the fifth invention, a preliminary discharge flow channel is formed in the large-diameter passage section, and a flow channel opening of the in-valve flow channel, on the side of the large-diameter section, can communicate with the preliminary discharge flow channel. Therefore, this enables two-stage oil relief by the relief valve, in the event of malfunction of the solenoid valve, and allows securing the safety of the device.

BRIEF DESCRIPTION OF THE DRAWINGS

FIG. 1A is a cross-sectional diagram illustrating the configuration of a first embodiment of the present invention and an oil supply circuit of an engine, FIG. 1B is a partial enlarged diagram (α) of FIG. 1A, FIG. 1C is a partial enlarged diagram (β) of the solenoid valve in FIG. 1A, and is a schematic cross-sectional diagram illustrating an open state of a connection flow channel and an auxiliary relief flow channel, and FIG. 1D is a partial enlarged diagram (β) of the solenoid valve in FIG. 1A, and is a schematic cross-sectional diagram illustrating an open state of a connection flow channel and an auxiliary discharge flow channel;

FIG. 2A is a schematic cross-sectional diagram illustrating the effect of relief oil in a low revolution range, in the first embodiment of the present invention, and FIG. 2B is an enlarged schematic cross-sectional diagram illustrating the effect of a solenoid valve;

FIG. 3A is a schematic cross-sectional diagram illustrating the effect of relief oil in a process of transition from a low revolution range to a medium revolution range in the first embodiment of the present invention, and FIG. 3B is an enlarged schematic cross-sectional diagram illustrating the effect of a solenoid valve;

FIG. 4A is a schematic cross-sectional diagram illustrating the effect of relief oil in a medium revolution range, in the first embodiment of the present invention, and FIG. 4B is an enlarged schematic cross-sectional diagram illustrating the effect of a solenoid valve;

FIG. 5A is a schematic cross-sectional diagram illustrating the effect elicited in the absence of relief in a high revolution range in the first embodiment of the present invention, and FIG. 5B is an enlarged schematic cross-sectional diagram illustrating the effect of a solenoid valve;

FIG. 6A is a schematic cross-sectional diagram illustrating the effect of relief oil in a high revolution range, in the first embodiment of the present invention, and FIG. 6B is an enlarged schematic cross-sectional diagram illustrating the effect of a solenoid valve;

FIG. 7 is a graph illustrating the relationship between engine revolutions and oil pressure in a process of transition from a low evolution range to a high revolution range, in the first embodiment of the present invention; and FIG. 8A is a cross-sectional diagram illustrating the configuration of a second embodiment of the present invention and an oil supply circuit of an engine, FIG. 8B is an enlarged cross-sectional diagram of a relevant portion in a closed state during use of relief oil as lubricating oil of a relief valve, and FIGS. 8C, 8D are enlarged schematic diagrams illustrating the effect of relief in the second embodiment.

DESCRIPTION OF THE PREFERRED EMBODIMENTS

Embodiments of the present invention are described below with reference to accompanying drawings. The present invention has a plurality of embodiments. A first embodiment will be explained first. The configuration of the present invention comprises mainly a housing A, a solenoid valve 6, a relief valve 4 and a spring 8. The solenoid valve 6 is mounted on a chassis 1 of the housing A. The relief valve 4 is accommodated in the chassis 1 (FIG. 1A).

In the chassis 1 there are formed, for instance, a valve passage 2, a main relief flow channel 31, an auxiliary relief flow channel 32 and the like. The valve passage 2 is a site at which the relief valve 4 is accommodated. The valve passage 2 comprises a small-diameter passage section 21 and a large-diameter passage section 22 that are formed as coaxial cylindrical shapes having dissimilar inner diameters. Specifically, the large-diameter passage section 22 having a large diameter dimension is formed on the opening side, and the small-diameter passage section 21 having a small diameter dimension is formed on the far side, with respect to the surface of the chassis 1.

A stepped surface portion 23 having a flat circumferential shape is present at the boundary between the small-diameter passage section 21 and the large-diameter passage section 22. In the present invention, the up-and-down direction is not particularly limited, but for the sake of an easier explanation, the passage direction of the valve passage 2 is taken as the up-and-down direction, such that the large-diameter passage section 22 of the valve passage 2 is set to stand above the small-diameter passage section 21. That is, the upward direction is the direction towards the side of the large-diameter passage section 22 (FIG. 1A).

The main relief flow channel 31 is a flow channel formed so as to communicate from the exterior of the chassis 1 to the leading end face, at the lower side, of the small-diameter passage section 21 of the valve passage 2 (FIG. 1A). The main relief flow channel 31 is formed in a direction at right angles with respect to the valve passage 2, but the state in which the main relief flow channel 31 is formed is not limited thereto. The leading end of the main relief flow channel 31 is formed in such a way so as to communicate with the leading end face (far-side face) of the small-diameter passage section 21 of the valve passage 2. That is, the leading end of the main relief flow channel 31 is configured in such a manner that a below-described main pressure-receiving surface 41a of the relief valve 4 receives readily the pressure of the relieved oil.

A main discharge flow channel 33 that communicates with the exterior of the chassis 1 is formed at the small-diameter passage section 21 of the valve passage 2. The main discharge flow channel 33 is a flow channel for returning relief oil that has flowed into the small-diameter passage section 21 from the main relief flow channel 31.

The auxiliary relief flow channel 32 is formed through branching from the main relief flow channel 31, inside the chassis 1. Part of the oil that flows through the main relief flow channel 31 flows into the auxiliary relief flow channel (FIG. 1C). The auxiliary relief flow channel 32 may be configured not as branching from the main relief flow channel 31, but, instead, in the form of an independent flow channel that is separate from the main relief flow channel 31 inside the housing A. In this case, however, the auxiliary relief flow channel 32 is positioned downstream of the main relief flow channel 31, in a circulation flow channel between an oil pump 91 and an engine 92.

A solenoid valve chamber 323 is formed at the upper leading end of the auxiliary relief flow channel 32 (on the side opposite to the branching site). A below-described direction control section 61 of the solenoid valve 6 is accommodated in the solenoid valve chamber 323. The solenoid valve 6 is mounted from outside the chassis 1. In order to assemble the solenoid valve 6, thus, the upper end portion of the auxiliary relief flow channel 32 runs through the surface of the chassis 1.

The auxiliary relief flow channel 32 communicates with the large-diameter passage section 22 of the valve passage 2 via the solenoid valve 6. The flow channel, in the auxiliary relief flow channel 32, between the large-diameter passage section 22 and the solenoid valve 6, will be referred to as connection flow channel 321. The connection flow channel 321 belongs to the auxiliary relief flow channel 32 and is a constituent part of the auxiliary relief flow channel 32.

The auxiliary relief flow channel 32 is configured so as to be switched, by the solenoid valve 6, between communicating with and being shut off from the large-diameter passage section 22. An auxiliary discharge flow channel 322 is formed from the auxiliary relief flow channel 32, via the solenoid valve 6. The auxiliary discharge flow channel 322 has the role of returning oil to a pump intake side. The openings of the connection flow channel 321 and of the auxiliary discharge flow channel 322 inward of the auxiliary relief flow channel 32 are formed so as to be encompassed within the solenoid valve chamber 323.

The relief valve 4 is made up of a small-diameter section 41 and a large-diameter section 42. The small-diameter section 41 and the large-diameter section 42 are formed, to a cylindrical shape, integrally with each other in the axial direction. The relief valve 4 is used in a state where the axial direction thereof runs vertically, with the small-diameter section 41 at the bottom and the large-diameter section 42 at the top. The lower end of the small-diameter section 41 is the main pressure-receiving surface 41a. A stepped section formed at the boundary between the small-diameter section 41 and the large-diameter section 42 constitutes an auxiliary pressure-receiving surface 42a.

The axial direction dimension of the relief valve 4 is formed to be longer than the total passage length of the small-diameter passage section 21 of the valve passage 2. Specifically, the total length of the small-diameter section 41 in the axial direction need only be of slightly larger dimension than the total length of the small-diameter passage section 21. As a result, a gap is normally present between the stepped surface of the valve passage 2 and the auxiliary pressure-receiving surface 42a of the relief valve 4 that is accommodated in the valve passage 2, and there is formed a structure such that the auxiliary pressure-receiving surface 42a can readily receive the pressure of relief oil.

The solenoid valve 6 comprises a direction control section 61 and an electromagnetic control section 62. The direction control section 61 is accommodated in the solenoid valve chamber 323 of the auxiliary relief flow channel 32, and part of the electromagnetic control section 62 is mounted on a recessed placement section 11 that is formed in the chassis 1. An O-ring for hermetically dividing the oil passage is provided between the solenoid valve chamber 323 and the direction control section 61 of the solenoid valve 6. The O-ring prevents oil leaks. The solenoid valve 6 is fixed to the housing A by some fixing means, for instance screwing or the like.

The solenoid valve 6, the role whereof is direction control, has the direction control section 61 that controls the flow direction between the auxiliary relief flow channel 32, the connection flow channel 321 and the auxiliary discharge flow channel 322. With the connection flow channel 321 as the basic flow channel through which oil can flow at normal times, the direction control section 61 switches selectively between communication between the connection flow channel 321 and the auxiliary relief flow channel 32, and communication between the connection flow channel 321 and the auxiliary discharge flow channel 322.

The control operation of the solenoid valve 6 is performed by the electromagnetic control section 62. At first, some of the oil that flows through the main relief flow channel 31 flows into the auxiliary relief flow channel 32 (FIG. 1C). When there is selected communication between the connection flow channel 321 and the auxiliary relief flow channel 32, or communication between the connection flow channel 321 and the auxiliary discharge flow channel 322, the other communication is in a shut-off state such that no oil can flow.

The direction control section 61 of the solenoid valve 6 has a cylindrical shape, and is accommodated inside the solenoid valve chamber 323, which is a cylindrical cavity having substantially the same diameter (FIG. 1A). The direction control section 61 has an axial direction control flow channel 61a, a first diameter-direction control flow channel 61b, and a second diameter-direction control flow channel 61c. The axial direction control flow channel 61a has an oil inflow opening at an end face of the axial-direction lower end of the direction control section 61.

The first diameter-direction control flow channel 61b and the second diameter-direction control flow channel 61c are formed, along the axial direction, at two dissimilar sites, at the top and the bottom, such that the first diameter-direction control flow channel 61b is positioned at the bottom and the second diameter-direction control flow channel 61c is positioned at the top. The first diameter-direction control flow channel 61b and the second diameter-direction control flow channel 61c communicate with each other via the axial direction control flow channel 61a. The site at which the axial direction control flow channel 61a and the lower-side first diameter-direction control flow channel 61b intersect each other constitutes a valve chamber 61d. A spherical valve member 64 is accommodated in the valve chamber 61d (FIGS. 1C, 1D).

The lower-side first diameter-direction control flow channel 61b communicates with the connection flow channel 321. The upper-side second diameter-direction control flow channel 61c communicates with the auxiliary discharge flow channel 322. At the outer periphery of the direction control section 61 there is formed an outer peripheral groove 61e that extends around in one circle and that has, as the diameter thereof, both end portions of the first diameter-direction control flow channel 61b. At the outer periphery of the direction control section 61 there is formed also a outer peripheral groove 61f that extends around in one circle and that has, as the diameter thereof, both end portions of the second diameter-direction control flow channel 61c.

The outer peripheral grooves 61e, 61f allow the direction control section 61 to be arranged freely in a rotation direction. Ordinarily, the valve member 64 is pressed towards the bottom of the valve chamber 61d by an operating shaft 63, with the solenoid valve 6 in an off state, such that communication between the axial direction control flow channel 61a and the lower-side first diameter-direction control flow channel 61b is shut off, and no relief oil can flow in (FIG. 1D).

The electromagnetic control section 62 has the operating shaft 63 that reciprocates so as to rise and descend along the axial direction. This operation is elicited through electromagnetic control by the electromagnetic control section 62. By descending, the operating shaft 63 causes the valve member 64 to be pressed downward, thereby shutting off inflow of relief oil (FIG. 1D). The valve member 64 is released, and inflow of relief oil is enabled, through rising of the operating shaft 63 (FIG. 1C).

An explanation follows next on the direction control effect of the solenoid valve 6. The relief valve device of the present invention is built into an oil circulation flow channel S between the oil pump 91 and the engine 92. Some of the oil from the oil circulation flow channel S flows into the main relief flow channel 31 of the housing A. The oil flowing into the main relief flow channel 31 communicates with the small-diameter passage section 21 of the valve passage 2, such that the oil, as-is, presses against the main pressure-receiving surface 41a of the relief valve 4.

Some of the oil that flows into the main relief flow channel 31 flows into the auxiliary relief flow channel 32. The direction of the oil that flows into the auxiliary relief flow channel 32 is controlled by the solenoid valve 6, such that the auxiliary relief flow channel 32 and the connection flow channel 321 are brought to a communication (open) or shut-off (closed) state, whereupon the auxiliary relief flow channel 32 and the large-diameter passage section 22 of the valve passage 2 communicate with or are shut-off from each other.

When the solenoid valve 6 is off, the operating shaft 63 of the electromagnetic control section 62 is in a state of pressing downward the valve member 64 in the direction control section 61, such that the inlet between the auxiliary relief flow channel 32 and the axial direction control flow channel 61a in the valve chamber 61d is shut off. Inflow of relief oil through the auxiliary relief flow channel 32 is discontinued as a result. The large-diameter passage section 22, the connection flow channel 321 and the auxiliary discharge flow channel 322 communicate now with each other. As a result, the large-diameter passage section 22 is linked to the atmosphere, the space in the large-diameter passage section 22 becomes no longer hermetic, and the movement direction of the relief valve 4 is not hampered.

When the solenoid valve 6 is switched on, the operating shaft 63 of the electromagnetic control section 62 rises, pressing of the valve member 64 in the direction control section 61 is released, and the valve member 64 is brought to a free state. As a result, the inlet between the auxiliary relief flow channel 32 and the axial direction control flow channel 61a in the valve chamber 61d can be opened, whereupon the momentum of the relief oil inflow from the auxiliary relief flow channel 32 causes the valve member 64 to rise up, and the relief oil flows into the direction control section 61.

In the valve chamber 61d, the valve member 64 shuts off the opening through which there communicate the lower-side first diameter-direction control flow channel 61b and the upper-side second diameter-direction control flow channel 61c. As a result, the auxiliary relief flow channel 32, the connection flow channel 321 and the large-diameter passage section 22 communicate now with each other, and relief oil is fed into the large-diameter passage section 22, so that the relief oil can press against the auxiliary pressure-receiving surface 42a of the relief valve 4.

A relief operation of the present invention will be explained at various revolution ranges of the engine 92. The relief valve device of the present invention performs a relief operation in accordance with the revolutions Ne of the engine 92. The relief operation varies between a low revolution range, medium revolution range, and high revolution range of the revolutions Ne.

The relief operation will be explained first for a low revolution range of engine revolutions Ne (FIG. 2). The low revolution range in the present application extends from 0 (zero) to a revolutions Ne of about 1000 rpm. The solenoid valve 6 is brought to an off state according to an operation command. In the electromagnetic control section 62, the operating shaft 63 presses the valve member 64, as a result of which communication between the auxiliary relief flow channel 32 and the axial direction control flow channel 61a is shut off. The large-diameter passage section 22 accommodated in the large-diameter section 42, the connection flow channel 321 and the auxiliary discharge flow channel 322 communicate now with each other.

As a result, the large-diameter passage section 22 is open so as to communicate with the atmosphere (FIG. 2B). The oil pressure of the relief oil is such that only relief oil flowing through the main relief flow channel 31 acts on the main pressure-receiving surface 41a of the relief valve 4 (FIG. 2A). In a low revolution range, however, the pressure of relief oil is low, and the relief valve 4 remains substantially immobile. Thus, no relief takes place.

A relief operation in a medium revolution range of the engine 92 will be explained next (FIG. 3, FIG. 4). In a medium revolution range, the revolutions Ne are from about 1000 rpm to about 3500 rpm. In this medium revolution range the solenoid valve 6 is on. In the electromagnetic control section 62, the operating shaft 63 ceases to press the valve member 64, such that the auxiliary relief flow channel 32 and the axial direction control flow channel 61a can now communicate with each other.

In this released state, the valve member 64 is pushed up on account of the pressure of relief oil, whereupon the auxiliary relief flow channel 32, the axial direction control flow channel 61a and the first diameter-direction control flow channel 61b communicate with each other; at the same time, the valve member 64 pushed up on account of the pressure of the relief oil shuts off the communication between the axial direction control flow channel 61a and the second diameter-direction control flow channel 61c (FIG. 3B). As a result, the auxiliary relief flow channel 32 and the connection flow channel 321 communicate with each other via the direction control section 61.

The relief oil flows into the large-diameter passage section 22, since the auxiliary relief flow channel 32, the direction control section 61, and the connection flow channel 321 communicate now with each other. The relief oil that flows into the large-diameter passage section 22 presses against the auxiliary pressure-receiving surface 42a of the relief valve 4, while the relief oil flowing into the small-diameter passage section 21 from the main relief flow channel 31 presses against the main pressure-receiving surface 41a in the small-diameter passage section 21, and displaces thereby the relief valve 4 (FIG. 3A).

As a result, the pressure-receiving surface area of the relief valve 4 increases by virtue of the relief oil that presses against the main pressure-receiving surface 41a and the auxiliary pressure-receiving surface 42a of the relief valve 4. This translates into an increase in the resisting force against the spring 8, as a result of which the relief valve 4 moves in one stroke in a direction of compressing the spring 8.

The relief valve 4 continues moving as described above accompanying an increase in the revolutions Ne in the medium revolution range of the engine 92. As a result, the main pressure-receiving surface 41a of the small-diameter section 41 reaches the position of the main discharge flow channel 33, the relief oil can now be discharged through the main discharge flow channel 33, and a first relief is initiated (FIG. 4A). As a result, optimal relief can take place in the medium revolution range of the revolutions Ne of the engine 92, and oil pressure can be maintained properly.

A relief operation in which the revolution Ne is in a high revolution range of the engine 92 will be explained next (FIG. 5, FIG. 6). The revolutions Ne in a high revolution range are about 3500 rpm or more. The solenoid valve 6 is switched off once more (FIG. 5B). That is, the communication between the auxiliary relief flow channel 32 and the connection flow channel 321 is shut off, relief oil no longer flows from the auxiliary relief flow channel 32 into the large-diameter passage section 22, and the relief oil presses only against the main pressure-receiving surface 41a, from the main relief flow channel 31 (FIG. 5A).

Therefore, only the main pressure-receiving surface 41a of the relief valve 4 receives pressure, so that the pressure-receiving surface area is reduced. As a result, there decreases the resisting force against the spring 8, the elastic force of the spring 8 pushes the relief valve 4 back towards the small-diameter passage section 21, the main discharge flow channel 33 is plugged once more by the relief valve 4, and relief by relief oil is discontinued (FIG. 5A). The connection flow channel 321, the second diameter-direction control flow channel 61c and the auxiliary discharge flow channel 322 communicate now with each other as the relief valve 4 is pushed back. Therefore, oil in the large-diameter passage section 22 is discharged through the above-mentioned passages, and the relief valve 4 returns smoothly (FIG. 5B).

When the revolutions Ne of the engine 92, already in a high state (about 3500 rpm), and are further increased, the pressure of the relief oil rises immediately, and there increases the pressure of the relief oil that acts on just the main pressure-receiving surface 41a of the relief valve 4. As a result, the relief valve 4 is caused to move again, in one stroke, in the direction of compressing the spring 8, overcoming the elastic force of the latter, the small-diameter section 41 opens again the main discharge flow channel 33, and a second relief is initiated (FIG. 6A). The second relief pressure is higher than the first one.

Even if the Ne of the engine 92 are further increased in the high revolution range, the solenoid valve 6 remains in an off state, and the relief oil acts only on the main pressure-receiving surface 41a; as the revolutions increase, the relief valve 4 remains at all times in the state of the second relief, and an appropriate pressure is maintained (FIG. 6A).

FIG. 7 is a graph illustrating the state of oil pressure P in a low revolution range, medium revolution range and high revolution range of the revolutions Ne of the engine 92. In the present invention, as the graph of FIG. 7 clearly illustrates, the oil pressure P varies gradually from the beginning to the end of the medium revolution range, but rises abruptly at the high revolution range. High oil pressure can thus be achieved.

A second embodiment of the present invention is explained next with reference to FIG. 8. An in-valve flow channel 43 is formed inside the relief valve 4. The in-valve flow channel 43, specifically, is a flow channel that is formed extending from the main pressure-receiving surface 41a of the small-diameter section 41 over the outer peripheral side face 42b of the large-diameter section 42 (for instance, FIGS. 8A, 8C).

The in-valve flow channel 43 is made up of an axial direction flow channel 43a and a diameter-direction flow channel 43b, such that the axial direction flow channel 43a and the diameter-directs channel 43b communicate with each other. A flow channel opening of the axial direction flow channel 43a is positioned at the main pressure-receiving surface 41a of the small-diameter section 41, and flow channel openings of the diameter-direction flow channel 43b are positioned at the outer peripheral side face 42b of the large-diameter section 42.

The function (effect) of the in-valve flow channel 43 is to cause some relief oil that is fed into the small-diameter passage section 21 of the valve passage 2, from the main relief flow channel 31, to flow into the flow channel opening of the axial direction flow channel 43a, to flow from the axial direction flow channel 43a through the diameter-direction flow channel 43b, and to be discharged out of the flow channel openings that are positioned on the outer peripheral side face 42b of the large-diameter section 42.

The discharged relief oil fills the gap between the large-diameter passage section 22 and the outer peripheral side face 42b of the large-diameter section 42. By being supplied into the gap, the relief oil functions as lubricating oil upon displacement of the relief valve 4 in the valve passage 2 (FIG. 8B). Smooth and appropriate slidability are imparted as a result to the relief valve 4 and the valve passage 2.

In a third embodiment of the present invention, a preliminary discharge flow channel 34 is formed in the large-diameter passage section 22 of the valve passage 2, and the in-valve flow channel 43, in the same way as in the second embodiment, is formed in the relief valve 4. When the flow channel opening of the diameter-direction flow channel 43b of the in-valve flow channel 43 reaches the preliminary discharge flow channel 34, upon displacement of the relief valve 4 on account of the pressure of the relief oil, the relief oil flows through the preliminary discharge flow channel 34 back to the oil pump 91.

In a relief operation by the relief valve 4, relief from the preliminary discharge flow channel 34 takes place first, and relief from the main discharge flow channel 33 takes place next (FIGS. 8C, 8D). The preliminary discharge flow channel 34 enables thus two-stage oil relief by the relief valve 4 in the event of malfunction of the solenoid valve 6.

What is claimed is:
1. A relief valve device, comprising:
a housing;
a relief valve including a small-diameter section having a main pressure-receiving surface and a large-diameter section including a stepped site as an auxiliary pressure-receiving surface, the small-diameter section and the large-diameter section being formed integrally with each other;
a valve passage including a small-diameter passage section and a large-diameter passage section;
a main discharge flow channel that communicates the small-diameter passage section with the exterior of the housing;

a main relief flow channel that communicates with the small-diameter passage section;

an auxiliary relief flow channel that communicates with the large-diameter passage section;

a solenoid valve mounted on the auxiliary relief flow channel; and a spring that elastically urges the relief valve in a direction opposite to a pressure relief direction, wherein the relief valve is displaced by both oil that flows into the large-diameter passage section pressing against the auxiliary pressure-receiving surface of the relief valve and oil that flows into the small-diameter passage section pressing against the main pressure-receiving surface of the relief valve, and wherein the solenoid valve is controlled so as to switch between communication and shut-off between the auxiliary relief flow channel and the large-diameter passage section, in accordance with an increase or a decrease in engine revolutions, and the oil that flows into the large-diameter passage section is discharged when the shut-off is implemented.

2. The relief valve device according to claim 1, wherein the auxiliary relief flow channel branches from the main relief flow channel.

3. The relief valve device according to claim 1, wherein an axial direction dimension of the small-diameter section of the relief valve is formed to be longer than a total passage length of the small-diameter passage section.

4. The relief valve device according to claim 1, wherein an in-valve flow channel, which communicates from the main pressure-receiving surface over an outer peripheral side face of the large-diameter section, is formed inside the relief valve.

5. The relief valve device according to claim 4, wherein a preliminary discharge flow channel is formed in the large-diameter passage section, and a flow channel opening of the in-valve flow channel, on a side of the large-diameter section, is configured to communicate with the preliminary discharge flow channel.

6. The relief valve device according to claim 2, wherein an axial direction dimension of the small-diameter section of the relief valve is formed to be longer than a total passage length of the small-diameter passage section.

7. The relief valve device according to claim 2, wherein an in-valve flow channel, which communicates from the main pressure-receiving surface over an outer peripheral side face of the large-diameter section, is formed inside the relief valve.

8. The relief valve device according to claim 3, wherein an in-valve flow channel, which communicates from the main pressure-receiving surface over an outer peripheral side face of the large-diameter section, is formed inside the relief valve.

9. The relief valve device according to claim 6, wherein an in-valve flow channel, which communicates from the main pressure-receiving surface over an outer peripheral side face of the large-diameter section, is formed inside the relief valve.

10. The relief valve device according to claim 7, wherein a preliminary discharge flow channel is formed in the large-diameter passage section, and a flow channel opening of the in-valve flow channel, on a side of the large-diameter section, is configured to communicate with the preliminary discharge flow channel.

11. The relief valve device according to claim 8, wherein a preliminary discharge flow channel is formed in the large-diameter passage section, and a flow channel opening of the in-valve flow channel, on a side of the large-diameter section, is configured to communicate with the preliminary discharge flow channel.

12. The relief valve device according to claim 9, wherein a preliminary discharge flow channel is formed in the large-diameter passage section, and a flow channel opening of the in-valve flow channel, on a side of the large-diameter section, is configured to communicate with the preliminary discharge flow channel.

13. The relief valve device according to claim 1, wherein the small-diameter section and the large-diameter section are configured to receive a pressure from the oil.

14. The relief valve device according to claim 1, further comprising:

an auxiliary relief flow channel branching from the main relief flow channel, a part of the oil that flows through the main relief flow channel flowing into the auxiliary relief flow channel; and a connection flow channel including a flow channel that is located in the auxiliary relief flow channel between the large-diameter passage section and the solenoid valve.

15. The relief valve device according to claim 14 wherein the solenoid valve comprises a direction control section that controls a flow direction between the auxiliary relief flow channel, the connection flow channel, and the auxiliary discharge flow channel.

16. The relief valve device according to claim 15, wherein, when the auxiliary relief flow channel, the direction control section, and the connection flow channel communicate with each other, the oil flows into the large-diameter passage section.

* * * * *